United States Patent [19]

Schevey

[11] Patent Number: 4,804,464
[45] Date of Patent: Feb. 14, 1989

[54] SYSTEM FOR IN SITU UPGRADING OF THE PURITY OF A LIQUID AND FLUSHING A FILTRATION SYSTEM

[75] Inventor: William R. Schevey, Berlin Township, Wayne County, Pa.

[73] Assignee: HMC Patents Patents Holding Co., Inc., Hampton, N.H.

[21] Appl. No.: 727,941

[22] Filed: Apr. 26, 1985

[51] Int. Cl.$^4$ ............................................. B01D 13/00
[52] U.S. Cl. .................................. 210/96.1; 210/106; 210/109; 210/137; 210/195.1; 210/196; 210/103
[58] Field of Search ............... 210/101, 103, 106, 109, 210/136, 137, 167, 194, 195.1, 196

[56] References Cited

U.S. PATENT DOCUMENTS

| | | | |
|---|---|---|---|
| 3,531,405 | 9/1970 | Zieversefal | 210/101 |
| 3,908,871 | 9/1975 | Gottwald | 222/400.7 |
| 4,092,245 | 5/1978 | Franks et al. | 210/169 |
| 4,151,085 | 4/1979 | Nalik | 210/101 |
| 4,282,093 | 4/1981 | Haga et al. | 210/101 |
| 4,284,501 | 8/1951 | Schon | 210/196 |
| 4,347,946 | 9/1982 | Nichols | 220/375 |
| 4,505,824 | 3/1985 | Akamine | 210/695 |

FOREIGN PATENT DOCUMENTS 0070699  1/1983  European Pat. Off. .

Primary Examiner—H. M. S. Sneed
Assistant Examiner—Sharon T. Cohen
Attorney, Agent, or Firm—Arthur J. Plantamura

[57] ABSTRACT

A system is provided for feeding a process or bath with a high purity liquid and when needed upgrading or maintaining the purity of such liquid when delivered from a bulk shipping container. In the system, the liquid in which a high degree of purity is desired is pumped through a filter and sensor which detects the level of particulates while maintaining the integrity of the product against contamination. The purity of the liquid is upgraded by pumping, i.e., recirculating, the liquid through a filtration media while sensing the purity, and returning the processing liquid when the desired level of purity is reached. A gas vent filter is used to purify air or vapor passing into or out of the system avoids pressure or vacuum buildup.

5 Claims, 2 Drawing Sheets

SYSTEM FOR IN SITU UPGRADING OF THE PURITY OF A LIQUID AND FLUSHING A FILTRATION SYSTEM

DESCRIPTION

The present invention relates to a system for upgrading the purity of a liquid, such as a low particulate liquid chemical that is employed in the processing of a semiconductor components for the electronic industry. More particularly, the invention relates to a versatile in situ system which has the capability of upgrading the pruity of a liquid feed from a shipping container and of flushing impurities from a filtration element without exposing the processing stream to impurities which might otherwise contaminate the work product. The invention includes, also, the capability of replacing the spent liquid bath without exposing the processing liquid to contamination.

BACKGROUND OF THE INVENTION

Various liquids which are shipped in bulk containers are exposed to conditions which adversely affect the level of purity of these liquids. In many situations the maintenance of high purity is necessary for the practical acceptance of the liquid. As an example, in semiconductor applications it is essential that chemicals of high purity be used in various processing steps; otherwise the resulting product is not acceptable. The sources of contamination for these bulk liquids may be introduced at various stages such as when the bulk container is filled or when the liquid in the bulk container is withdrawn and, particularly, when only a part of the liquid is withdrawn and the bulk container is recapped to preserve the balance of the contents for a subsequent use. In such cases the contaminant may be introduced by the contaminated fittings or from a filter elements which are contaminated or even by ambient or other gas air which displaces the amount of liquid withdrawn from the container. In some instances a liquid in the replenishing bulk container is less than the desired purity due to the original relatively low purity level or because the product has been subsequently exposed to contaminants. It is, therefore, important that this purity be upgraded without requiring that the product be returned to the packaging source for reprocessing or otherwise upgrading of the purity.

An additional problem of contamination and often considerable delay arises when the spent liquid bath is to be replaced with fresh liquid A considerable contamination exposure, for example, is introduced during the uncoupling and re-coupling of fittings in the system during the replacement of the spent high purity treating liquid.

It is apparent, accordingly, that a need exists for a bulk packaging purification and delivery system that provides for maintaining a high level of purity of the product in a bulk liquid container and for facilitating the upgrading of the purity of the liquid in the container.

SUMMARY OF THE INVENTION

In accordance with the invention, a system is provided whereby a semiconductor producer can purchase a liquid chemical product with has a higher particle count, i.e., it contains more impurities than can be used in the process, and upgrade the liquid in situ while delivering it to the operating bath.

The system is devised to permit the flushing of an existing or replacement filter element to free it of contaminants that might otherwise enter the processing stream.

The system in general advantageously provides the capability of upgrading and/or maintaining the high purity of a chemical in a processing liquid feed chemical by utilizing a novel arrrangement of pumping means, filters, impurity content sensors and valving to expeditiously deliner the processing liquid of the desired purity. While the invention is primarily aimed at liquid chemicals employed in processing electronic, e.g., semiconductor components in which high purity of chemicals to avoid contamination is essential, it will be apparent that the system may be applied also to other liquid products, e.g., hydraulic fluids, where a high state of purity in the liquid is important.

In general in a preferred embodiment the purification system of the invention involves withdrawing the liquid from a shipping container and providing means to pump it through a product filter, to sense the level of impurities in the liquid and then to deliver the purified liquid once the desired level of purity is attained to the processing operations. A suitable vent (gas) filter is preferably used on the container from which liquid is being withdrawn, to avoid build-up of pressure or vacuum in the system. This also avoids the contamination of the pure product during unloading of the product from the bulk container. When the product is pumped out of the container, the vent filter attached to the smaller opening permits only clean air or other inert gas to enter the container as product is removed; this also prevents vacuum build-up in the container.

DESCRIPTION OF THE PREFERRED EMBODIMENT

In accordance with the invention, a system is provided by which a processing liquid can be up-graded and also a new filter can be preflushed simultaneously to produce a high quality fluid for delivery to a working system. Currently in the prior art, one wishing to use a high quality low particle product must purchase such a fluid pre-filtered or set up an elaborate system to process the liquid. Filters as purchased can contain manufacturing and shipping debree which sheds downstream when the filter is first used. In the system of the invention, a new filter may be installed and flushed without contaminating the system downstream of the filter.

Figure 1:
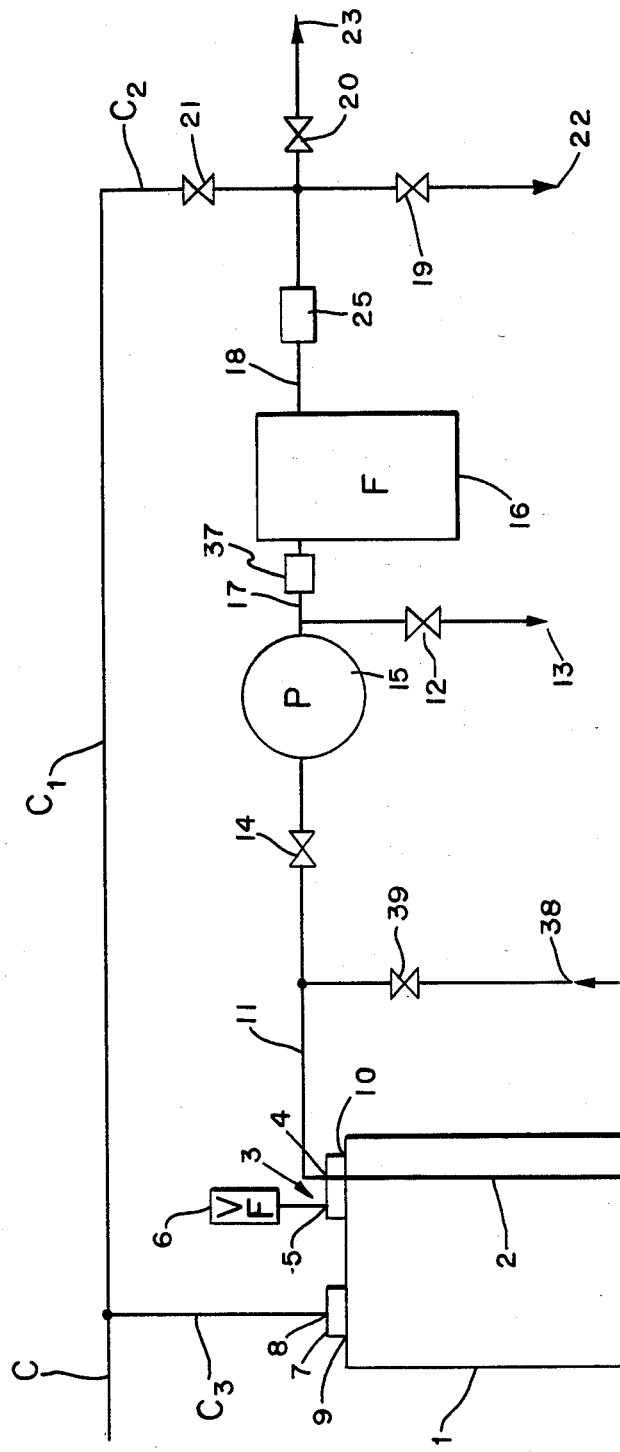
FIG. 1 illustrates in schematic form an adaptation of the system of the invention in which the liquid contents of a container are recirculated to enhance the purity thereof.

In FIG. 1 of the the drawing, a shipping container 1 holding a fluid of insufficient purity (high particle count) which it is necessary to upgrade for the intended use such as when a chemical is to be used in processing electronic semi-conductors which require high purity be upgraded. In the operation, the fluid in container 1 is drawn up through the dip tube 2 through a suitably constructed bung 3 in the container 1 and delivered to pump 15 through line 11. The fluid can be monitored at port 13 to determine the quality of the liquid in the container or passed through filter 15 and monitored at port 22 or by a sensor 25. A second sensor 37 may also be employed to indicate the level of purity (condition) of the fluid being introduced from the container into the filter. If the liquid in the drum is above particulate specifications, this will be indicated at sample port 13 or sensor 37. If the problem of high particulate content is due to a shedding filter, this will be obvious at sample point 22 or at sensor 25. If the particulate count is high, the product will be circulated through the filter 16 and back to container 1 by leaving valve 21 open and valve 20 closed. The liquid can be recirculated until sample port 22 or sensor 25 indicates a suitably clean liquid. If the desired impurity level is not attained or if the time for attaining it is unduly prolonged, this indicates a filter problem, i.e. the filter is defective or spent or the filter has been improperly installed. In the above system, a vent (gas) filter 6 may also used to prevent pressure or vacuum from being created in the container. If desired, additions can be made to the sytem by drawing a new supply of liquid into the system through port 38 by opening valve 34 and delivering a low particle product to the point of use.

The following describes the use of the above system whereby a semiconductor producer can purchase a chemical product which has a higher particle count than can be used in his process, and upgrade it while delivering it to the operating bath or process. In the proposed system, it is seen, chemicals of a lesser quality (higher particle count) in container 1 can be upgraded or a new filter 16 can be installed and the down stream side cleaned up without contaminating the operating end use, e.g. the operating bath or other process end use, e.g., spray etching or cleaning.

In the first operating routine, valve 20 is closed to the system and return valve 21 is open. The filtered material is circulated until sensor 25 indicates that the product is of sufficient quality to be used. Then valve 21 is closed and valve 20 is opened delivering the product to the end use port 23.

If filter 16 needs to be changed, the valve 21 is opened and valve 20 closed and the material is circulated until sensor 25 indicates that the material is of sufficient quality to be used. Sensor 25 is useful for monitoring the filtrate any time the product is being delivered. It will indicate such problems as the filter by-pass or failure. This prevents contaminated material from being delivered to the clean bath or process.

Figure 2:
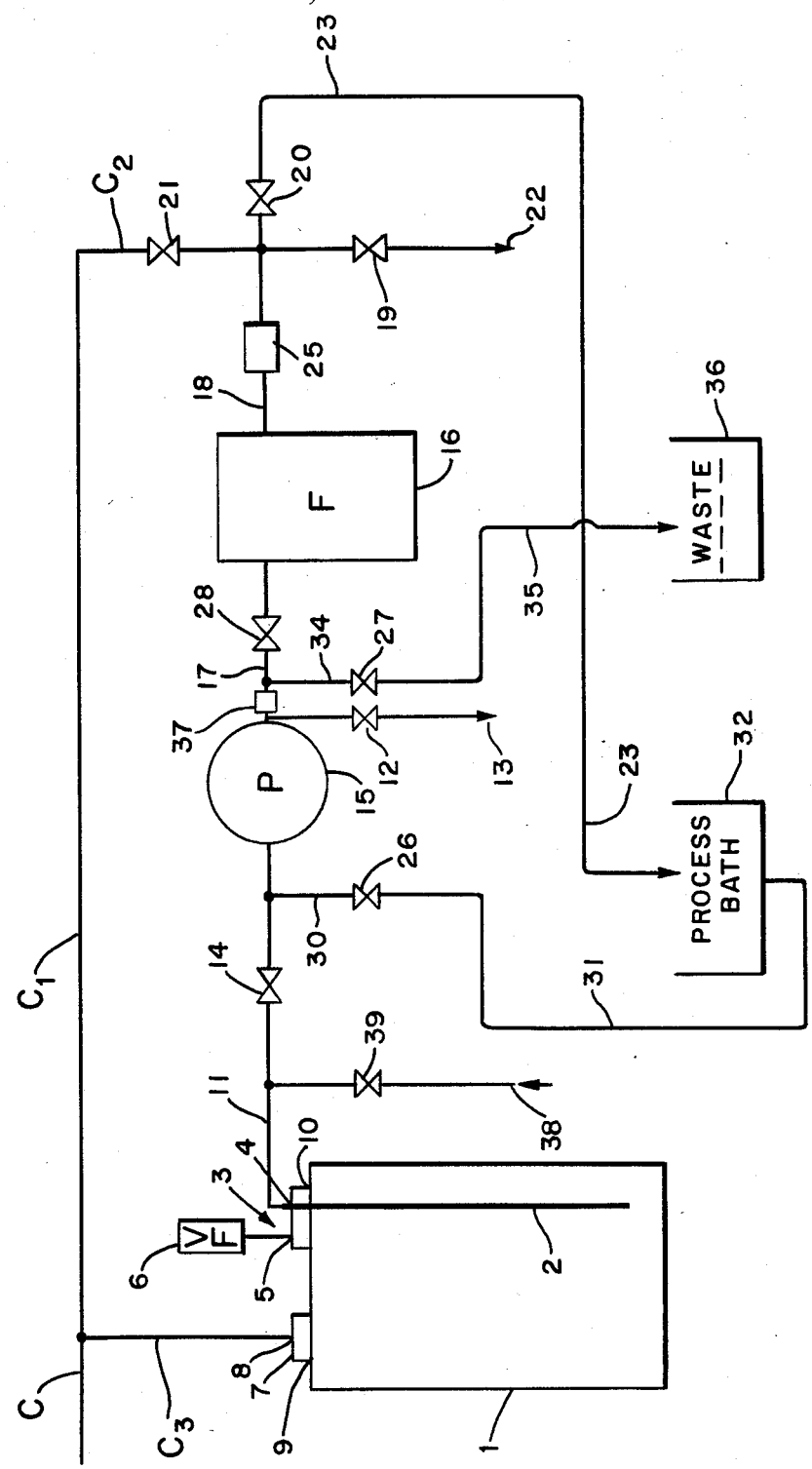
FIG. 2 is a schematic showing another adaptation of the arrangement of the invention illustrating the flow schematic used in maintaining purity of the bath and for the draining and the replacement of the depleted liquid treating bath.

In FIG. 2, which is a modified form of FIG. 1, the system shown may also be used to recirculate the process bath and to empty out the process bath. As shown in FIG. 2, when it is desired to fill the process bath 32, the fluid in container 1 is drawn up through the dip tube 2 through a suitably constructed bung 3 in the container 1, and delivered to pump 15 through line 11. The fluid can be monitored at port 13 to determine the quality of the liquid in the container or passed through filter 15 and monitored at port 22 or by a sensor 25. A second sensor 37 may also be employed to indicate the level of particulates (condition) of the fluid being introduced from the container 1 into the filter 15. If the liquid in the drum is above specifications, this will be indicated at sample port 13 or at sensor 37. If the problem is due to a shedding filter, this will be obvious at sample point 22 or at sensor 25. The product, when appropriate, may be circulated through the filter 16 and back to container 1 leaving valve 21 open and valve 20 closed. The system can be circulated back until sample port 22 or sensor 25 indicates a clean liquid. If the desired impurity level is not attained or the time for attaining it is unduly prolonged, it indicates a filter problem, i.e. the filter is defective or spent or the filter has been improperly installed. In the above system, a vent (gas) filter 6 may also be used to prevent pressure or vacuum from being created in the container.

In a system where a semiconductor component producer desires to use a chemical product which has a higher particle count than can be used in his process, the chemical product can be upgraded while it is being delivered to the process. This is effected in the system shown in FIG. 2 as follows: Chemicals of a lesser quality (higher particle count) in container 1 can be upgraded or a new filter 16 can be installed and the down stream side cleaned up without contaminating the end use operating bath or process in the following manner.

In proceeding to process the high particle count chemical valve 20 is closed to the system and return valve 21 is open. In this way, the material is recirculated through line c; to the container 1 and filter 16 until sensor 25 indicates that the product is of sufficient quality to be used. Then valve 21 is closed and valve 20 is opened delivering the product to the end use flow line 23.

When filter 16 needs to be replaced, the valve 21 is opened and valve 20 closed and the liquid material is recirculated until sensor 25 indicates that the material is of sufficient quality to be used. Sensor 25 is useful for monitoring the filtrate any time the product is being delivered. It will also indicate such problems as filter by-pass or failure. This prevents contaminated material from being delivered to the process bath or other end use, such as spray etch (not shown). An additional purity sensor 37 may be used to indicate the quality of liquid to be purified.

The system of FIG. 2 can also be used to empty the process bath 32 through pump 15 by closing valves 14 and 28 and opening valves 26 and 27. In this way, the material in the process bath 32 is pumped via line 31 to waste 36.

The process bath 32 is refilled by closing valves 26 and 27 and opening valves 14 and 28 and 20. When the process bath 32 has reached the proper fill level, the valve 20 is closed. To recirculate the process bath 32 through the filter 16, valve 14 is closed and valves 26 and 20 are opened, thus looping the bath through pump 15 and the filter 16.

Sensors 25 and 37 may be used to monitor the quality of material (from the process bath) before it enters the filter and after filtration.

Although the invention has been described and illustrated in connection with preferred embodiments, it will be understood that modifications and variations may be made without departing from the essence and scope of the invention as defined in the appended claims.

What is claimed is:

1. A system for upgrading the purity of a liquid chemical used in semiconductor components manufacture and for flushing impurities from a filter for the chemical and delivering the purified liquid to an operating use, comprising a container for the liquid chemical, a means to withdraw the liquid from the container, a sensor to automaticaly indicate the level of purity of the liquid chemical to be withdrawn, a liquid filter through which the liquid from said container is passed until a predetermined level of purity, as determined by particulate content, is attained, valve means to recirculate the liquid withdrawn from said container through said liquid filter for further purification in the event that the requisite purity is not attained, and means to deliver the purified liquid, which has attained the required purity level to the operating use.

2. The system of claim 1 wherein the liquid furnished to a process bath, and the process bath is recirculated through the filter and returned to the process bath to maintain the requisite purity in the bath.

3. The system of claim 2 wherein a purity sensor is positioned on the entry side of the filter.

4. The system of claim 3 wherein an additional sensor is positioned on the exit side of the filter.

5. The system of claim 2 wherein the process bath is drained by flow valve adjustment thereby by-passing the filter and flowing the process bath fluid to waste without altering the arrangement of the system lines.

* * * * *